(12) United States Patent
Oyama et al.

(10) Patent No.: US 10,653,954 B2
(45) Date of Patent: May 19, 2020

(54) SERVER, INFORMATION PROCESSOR, RECORDING MEDIUM, AND GAME CONTROLLING METHOD

(71) Applicant: Universal Entertainment Corporation, Tokyo (JP)

(72) Inventors: Masaki Oyama, Tokyo (JP); Atsushi Kumita, Tokyo (JP); Toshikazu Jinnouchi, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 0 days.

(21) Appl. No.: 16/140,974

(22) Filed: Sep. 25, 2018

(65) Prior Publication Data

US 2019/0091568 A1 Mar. 28, 2019

(30) Foreign Application Priority Data

Sep. 28, 2017 (JP) .................................. 2017-187770

(51) Int. Cl.
*A63F 13/35* (2014.01)
*H04L 29/06* (2006.01)
*H04L 29/08* (2006.01)

(52) U.S. Cl.
CPC .............. *A63F 13/35* (2014.09); *H04L 67/04* (2013.01); *H04L 67/38* (2013.01)

(58) Field of Classification Search
USPC .......................................................... 463/42
See application file for complete search history.

(56) References Cited

U.S. PATENT DOCUMENTS

| | | | |
|---|---|---|---|
| 2014/0187318 A1* | 7/2014 | Gallizzi | A63F 13/355 463/31 |
| 2016/0250551 A1* | 9/2016 | Suzuki | A63F 13/35 463/24 |
| 2017/0087464 A1* | 3/2017 | Perry | A63F 13/355 |
| 2017/0262154 A1* | 9/2017 | Black | G06F 3/04842 |
| 2018/0290060 A1* | 10/2018 | Noss | A63F 13/67 |
| 2019/0240572 A1* | 8/2019 | Perry | A63F 13/355 |

* cited by examiner

*Primary Examiner* — Pierre E Elisca
(74) *Attorney, Agent, or Firm* — Simpson & Simpson, PLLC; S. Peter Konzel

(57) ABSTRACT

The present invention is a server that causes a logged-in information processor to run a game among a plurality of information processors, comprising: executing to determine a present information of a content corresponding to a status information of the information processor of a transmission destination when receiving a present giving signal for giving a present to the information processor of the transmission destination identified by an ID information, and transmitting the present information to the information processor of the transmission destination, triggered by a predetermined action of the information processor of the transmission destination.

7 Claims, 9 Drawing Sheets

SERVER, INFORMATION PROCESSOR, RECORDING MEDIUM, AND GAME CONTROLLING METHOD

CROSS-REFERENCES TO RELATED APPLICATIONS

This Application is Entitled to the benefit of Japanese Pat. App. No. 2017-187770, filed on Sep. 28, 2017.

BACKGROUND OF THE INVENTION

1. Field of Invention

The present invention relates to a server, an information processor, a recording medium, and a game control method.

2. Description of Related Art

For example, the specification of U.S. Pat. No. 8,636,593 discloses a configuration having a plurality of gaming terminals connected via a server and a plurality of upper displays forming a common effect display screen, and wherein the gaming terminal determines whether or not a common game is being performed at the start of an independent special game, and the effect is performed in the gaming terminal only when the common game is not performed. In addition, Japanese Unexamined Patent Application Publication No. 2013-230227 discloses a network game in which items are presented among players by using bond parameters indicating the intimacy from one player to another player.

However, only by performing a common game among players or by presenting items among players using the bond parameters as shown in the above-described prior art, since the degrees of progress of the games in each player are different, there is a problem that the interaction between players tends to decrease.

SUMMARY OF THE INVENTION

It is an object of the present invention to provide a server, an information processor, a recording medium, and a game control method capable of suppressing a decline in the interaction between players caused by a difference between degrees of progress of games.

The present invention is a server that causes a logged-in information processor to run a game among a plurality of information processors, comprising:
a communication unit enabling a data communication with the information processor;
a memory storing an ID information for identifying each of the plurality of information processors, a status information indicating a status that increases correspondingly to the degree of progress in the game with respect to each of the plurality of information processors, and a present information indicating a content of the present given among the plurality of information processors; and
a controller programmed to execute the following processes.
(A1) A process of determining the present information of a content corresponding to the status information of the information processor of a transmission destination, when receiving a present giving signal for giving the present to the information processor of the transmission destination identified by the ID information;
(A2) a process of storing the present information determined in the process (A1) in the memory; and
(A3) a process of transmitting the present information stored in the process (A2) to the information processor of the transmission destination, the process (A3) being triggered by a predetermined action of the information processor of the transmission destination identified by the ID information.

According to the above configuration, even if a present is given from a player with a different degree of progress of the game, in particular, a small degree of progress, the present of the content corresponding to the degree of progress of the game of the information processor of the transmission destination identified by the ID information is obtained, and thus it is possible to suppress the decline of the interaction between players caused by the difference between the degrees of progress of the games.

In the process (A2) according to the present invention, the present information stored in the memory may be deleted after a lapse of a predetermined standby time.

According to the configuration mentioned above, by limiting the time for storing the present information to the predetermined standby time, it is possible to positively perform a predetermined action for acquiring the present information in the game.

The predetermined action in the process (A3) in the present invention may be logging in to the server.

According to the configuration mentioned above, it is possible to increase the frequency of participating in the game by increasing the number of logins to the server for acquiring the present information.

The present invention is an information processor connected to a server that causes a logged-in information processor to run a game among a plurality of information processors, comprising:
a communication unit enabling a data communication with the server;
a memory storing an ID information for identifying each of the plurality of information processors and a status information indicating a status that increases correspondingly to the degree of progress in the game; and
a controller programmed to execute the following processes.
(B1) A process of transmitting a present giving signal for giving a present to another information processor as a transmission destination by identifying the ID information; and
(B2) a process of obtaining the present of a content corresponding to the status information when receiving the present giving signal from another information processor as a transmission source.

According to the above configuration, even if a present is given from a player with a different degree of progress of the game, in particular, a small degree of progress, the present of the content corresponding to the degree of progress of the game of the information processor of the transmission destination identified by the ID information is obtained from the information processor of the transmission source, and thus it is possible to suppress the decline of the interaction between players caused by the difference between the degrees of progress of the games.

In the process (B1) of the present invention, the present giving signal may be transmitted on condition that a mission in the game is cleared.

According to the configuration mentioned above, it is possible to raise the motivation of the player to participate in the game by taking clearing the mission in the game as a condition for transmitting the present giving signal.

The present invention is a recording medium storing game program of an information processor connected to a server that causes a logged-in information processor to run a game among a plurality of information processors, and the game program of the information processor:

causes a computer, which comprises a communication unit enabling a data communication with the server and a memory storing an ID information for identifying each of the plurality of information processors and a status information indicating a status that increases correspondingly to the degree of progress in the game, to execute the following processes, (B1) A process of transmitting a present giving signal for giving a present to another information processor as a transmission destination by identifying the ID information; and (B2) a process of obtaining the present of a content corresponding to the status information when receiving the present giving signal from another information processor as a transmission source.

According to the above configuration, even if a present is given from a player with a different degree of progress of the game, in particular, a small degree of progress, the present of the content corresponding to the degree of progress of the game of the information processor of the transmission destination identified by the ID information is obtained from the information processor of the transmission source, and thus it is possible to suppress the decline of the interaction between players caused by the difference between the degrees of progress of the games.

The present invention is a game control method executed by a computer comprising a communication unit enabling a data communication with a server that causes a logged-in information processor to run a game among a plurality of information processors and a memory storing an ID information for identifying each of the plurality of information processors and a status information indicating a status that increases correspondingly to the degree of progress in the game, comprising:

(B1) A process of transmitting a present giving signal for giving a present to another information processor as a transmission destination by identifying the ID information; and (B2) a process of obtaining the present of a content corresponding to the status information when receiving the present giving signal from another information processor as a transmission source.

According to the above configuration, even if a present is given from a player with a different degree of progress of the game, in particular, a small degree of progress, the present of the content corresponding to the degree of progress of the game of the information processor of the transmission destination identified by the ID information is obtained from the information processor of the transmission source, and thus it is possible to suppress the decline of the interaction between players caused by the difference between the degrees of progress of the games.

DESCRIPTION OF THE PREFERRED EMBODIMENTS

The server, information processor, recording medium, and game control method of the present invention will be described based on the drawings.

(Server 7)

Figure 1:
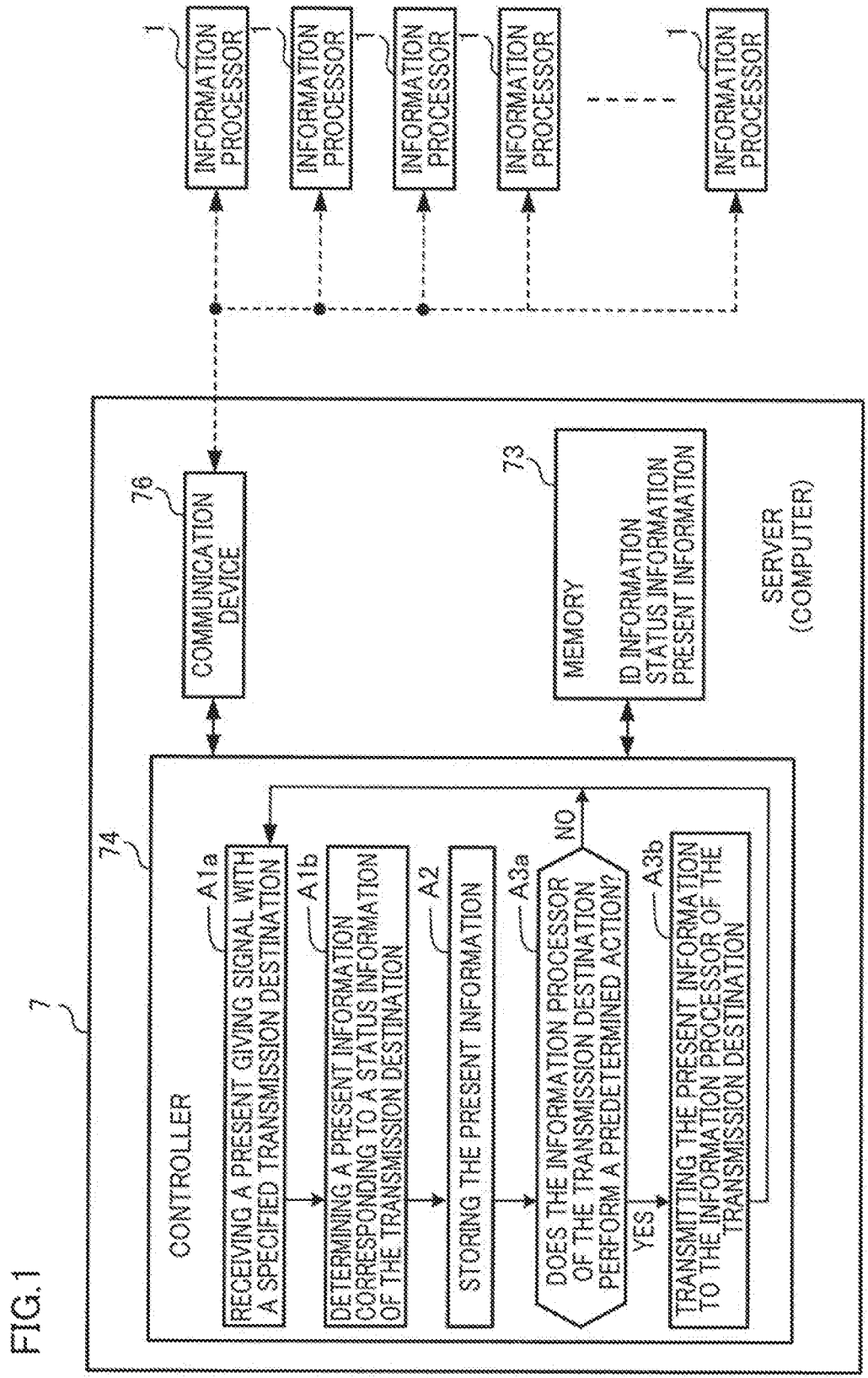
FIG. 1 is an illustrative view showing a schematic configuration of a server.

As shown in FIG. 1, the server 7 is configured to cause a logged-in information processor 1 to run a game among a plurality of information processors 1, and comprises a communication device 76 (communication unit) enabling a data communication with the information processor 1, a memory 73 storing an ID information for identifying each of the plurality of information processors 1, a status information indicating a status that increases correspondingly to the degree of progress in the game with respect to each of the plurality of information processors 1, and a present information indicating content of the present given among the plurality of information processors 1, and a controller 74 programmed to execute the following processes (A1) to (A3).

In the process (A1), when receiving a present giving signal for giving a present to the information processor 1 of a transmission destination identified by the ID information, the present information of a content corresponding to the status information of the information processor 1 of the transmission destination is determined. In the process (A2), the present information determined in the process (A1) is stored in the memory 73. In the process (A3), the present information stored in the process (A2) is transmitted to the information processor 1 of the transmission destination, the process (A3) being triggered by a predetermined action of the information processor 1 of the transmission destination identified by the ID information.

According to the configuration mentioned above, the server 7 implements a game control method in which the computer executes the above processes (A1), (A2), and (A3). In addition, the server 7 has a game program for executing the processes (A1), (A2), and (A3). Details will be described later.

Thereby, even if a present is given from a player with a different degree of progress of the game, in particular, a small degree of progress, the present of the content corresponding to the degree of progress of the game of the information processor 1 of the transmission destination identified by the ID information may be obtained, and thus it is possible to suppress the decline of the interaction between players caused by the difference between the degrees of progress of the games.

Here, the "degree of progress of a game" is exemplified by the level, rank, play time, and degree of paying of a player in the game. For example, when the player performs a game with a large payment amount for a long period of time, a high status corresponding to the play time and the payment amount is given.

The "present of a content corresponding to the degree of progress of a game" is described more specifically, and the information processor 1 can obtain points by purchasing a gem, purchasing a monthly pass, clearing a stage, achieving a mission, and raising a level, and 7 types of ranks are determined according to the obtained points. A beginner rank is determined at less than 500 points, a regular rank is determined at 500 points or more and less than 3000 points, a bronze rank is determined at 3000 points or more and less than 10,000 points, a silver rank is determined at 10,000 points or more and less than 100,000 points, a gold rank is determined at 100,000 points or more and less than 500,000 points, a platinum rank is determined at 500,000 points or more and less than 1 million points, and a diamond rank is determined at 1 million points or more, respectively. Then, the number of coins corresponding to the type of rank is determined as the content of the present. That is, 1000 coins are determined as the present of the beginner rank, 3000 coins are determined as the present of the regular rank, 5000 coins are determined as the present of the bronze rank, 10000 coins are determined as the present of the silver rank, 20000 coins are determined as the present of the gold rank, 50,000 coins are determined as the present of the platinum rank, and 100,000 coins are determined as the present of the diamond rank, respectively.

Further, a ticket, a coin, a gem, and an item corresponding to the type of rank are determined as the content of the present. Specifically, the present of the beginner rank is determined as "none". The present of the regular rank is determined as two bronze tickets, 10,000 coins and 10 gems. The present of the bronze rank is determined as three bronze tickets, one silver ticket, 300,000 coins and 30 gems. The present of the silver rank is determined as four bronze tickets, two silver tickets, 300 000 coins and 50 gems. The present of the gold rank is determined as five bronze tickets, three silver tickets, one gold ticket, 1 million coins, 100 gems and one item. The present of the platinum rank is determined as six bronze tickets, four silver tickets, two gold ticket, 2 million coins, 200 gems and two items. The present of the diamond rank is determined as seven bronze tickets, five silver tickets, three gold ticket, 3 million coins, 300 gems and three items.

The "predetermined action in the information processor 1" is, for example, an action in which the information processor 1 logs in to the server 7, an action to clear a mission such as a mini game provided in a game, an action to start a game, an action to end a game, an action in which a player who is a user of the information processor 1 inquires of the server 7 for the presence or absence of the present information, an action to inquire for the presence or absence of the present information by a timer in the information processor 1 regularly or irregularly, and the like. In addition, in a case that the "predetermined action" is logging in to the server 7, it is possible to increase the frequency of participating in the game by increasing the number of logins to the server for acquiring the present information.

In addition, the server 7 and the information processor 1 may be portable or stationary. Examples of the portable server 7 and information processor 1 include portable information devices such as a portable computer, a laptop computer, a notebook computer, a tablet personal computer, a handheld personal computer, a PDA (Personal Data Assistant), and a smart phone. As the stationary server 7 and information processor 1, a desktop personal computer and a game machine are exemplified.

The memory 73 stores various data such as ID information, status information, and present information. In addition, the memory 73 stores a program to be executed by the controller 74. The data and program stored in the memory 73 may be stored in advance at the factory shipment stage or may be downloaded and stored by the communication means from the server 7 or the like. The communication means may be a bidirectional communication path such as the Internet or a cable television, or may be a broadcast that transmits information only in one direction.

In addition, the data and program stored in the memory 73 may be stored in a recording medium such as a floppy disk, a CD-ROM, a DVD-ROM, an MO (magneto-optical disk), a flash memory or the like, and read out from the recording medium as necessary and then installed in the memory.

The program stored in the memory 73 is a game program of the server 7 that causes the logged-in information processor 1 to run a game among the plurality of information processors 1, which causes a computer, which comprises a communication device 76 (communication unit) enabling a data communication with the information processor 1 and a memory 73 storing an ID information for identifying each of the plurality of information processors 1, a status information indicating a status that increases correspondingly to the degree of progress in the game with respect to each of the plurality of information processors 1, and a present information indicating content of the present given among the plurality of information processors 1, to execute a process (A1b) of determining the present information of a content corresponding to the status information of the information processor 1 of a transmission destination when receiving a present giving signal for giving the present to the information processor 1 of the transmission destination identified by the ID information (A1a), a process (A2) of storing the present information determined in the process (A1b) in the memory 73, and a process (A3b) of transmitting the present information stored in the process (A2) to the information processor 1 of the transmission destination, the process (A3b) being triggered by a predetermined action of the information processor 1 of the transmission destination identified by the ID information (A3a).

In addition, in the process (A2) of the server 7, the present information stored in the memory 73 may be deleted after a lapse of a predetermined standby time. In this condition, by limiting the time for storing the present information to the predetermined standby time, it is possible to positively perform a predetermined action for acquiring the present information in the game.

(Information Processor 1)

Figure 2:
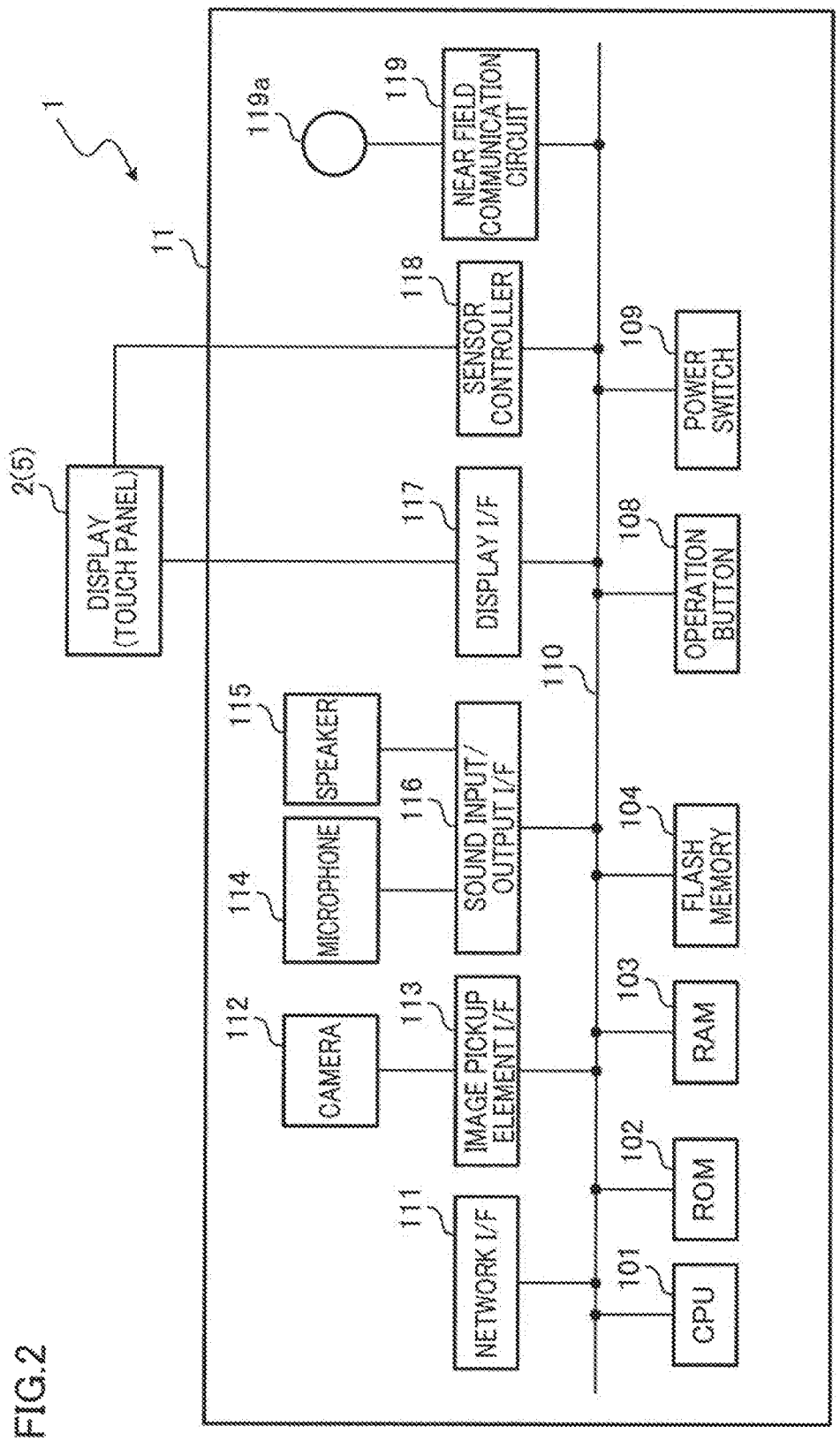
FIG. 2 is a block diagram showing an electric configuration of an information processor.

As shown in FIG. 2, an example of the information processor 1 connected to the server 7 will be specifically described. In addition, in the following description, a configuration is described in which a slot game for obtaining a game result based on the symbols when the symbols of the video reel are variably displayed and stopped is executed, but the present invention is not limited thereto.

The information processor 1 displays an ID image for identifying each of the plurality of information processors 1 set as the same group in the game screen and is connected with the server 7 that causes a logged-in information processor 1 to run a game among the plurality of information processors 1, which comprises a display 2 for displaying a image, a touch panel 5 provided on the entire surface of the display 2 for receiving an input from the player, a communication device enabling a data communication with the server 7, and a memory.

(Information Processor 1: Electric Configuration)

More specifically, the information processor 1 includes a CPU 101, a ROM 102, a RAM 103, a flash memory 104, an operation button 108, a power switch 109, a bus line 110, a network I/F 111, a camera 112, an image pickup element I/F 113, a microphone 114, A speaker 115, a sound input/output I/F 116, a display I/F 117, a sensor controller 118, a short-range communication circuit 119, and an antenna 119*a* of the short-range communication circuit 119 are provided in a cabinet 11.

The CPU (Central Processing Unit) 101 controls the overall operation of the information processor 1. The ROM (Read Only Memory) 102 stores a program used for driving the CPU 101, such as an IPL (Initial Program Loader). In addition, the ROM 102 may store the programs having the processes (A1) to (A4b) and the processes (B1) to (B5).

A RAM (Random Access Memory) 103 is used as a work area of the CPU 101. The flash memory 104 stores various data such as a game program, a communication program, image data, and voice data. The operation button 108 is a button that is operated when the information processor 1 is initially set. The power switch 109 is a switch for switching ON/OFF of the power of the information processor 1.

The network I/F (Interface) 111 is interface for performing a data communication by utilizing a communication network such as the Internet. The information processor 1 is connected to the server 7 in FIG. 1 via the network I/F 111 so as to enable a data communication. The camera 112 is a kind of built-in type image pickup unit that captures an image of a subject under the control of the CPU 101 to obtain image data. The image pickup element I/F 113 is a circuit that controls driving of the camera 112. The microphone 114 is a kind of built-in type sound collecting unit for inputting a sound. The sound input/output I/F 116 is a circuit for processing input and output of sound signals between the microphone 114 and the speaker 115 under the control of the CPU 101. The display I/F 117 is a circuit that transmits image data to the display 2 under the control of the CPU 101. The display 2 is provided on the front surface of the cabinet 11. The sensor controller 118 is a circuit that receives an input from the touch panel 5 provided on the display 2. The short-range communication circuit 119 is a communication circuit such as an NFC (Near Field Communication) (registered trademark), a Bluetooth (registered trademark), or the like. The bus line 110 is an address bus, a data bus, or the like for electrically connecting each component such as the CPU 101.

(Information Processor 1: Process Selection Function)

Figure 3:
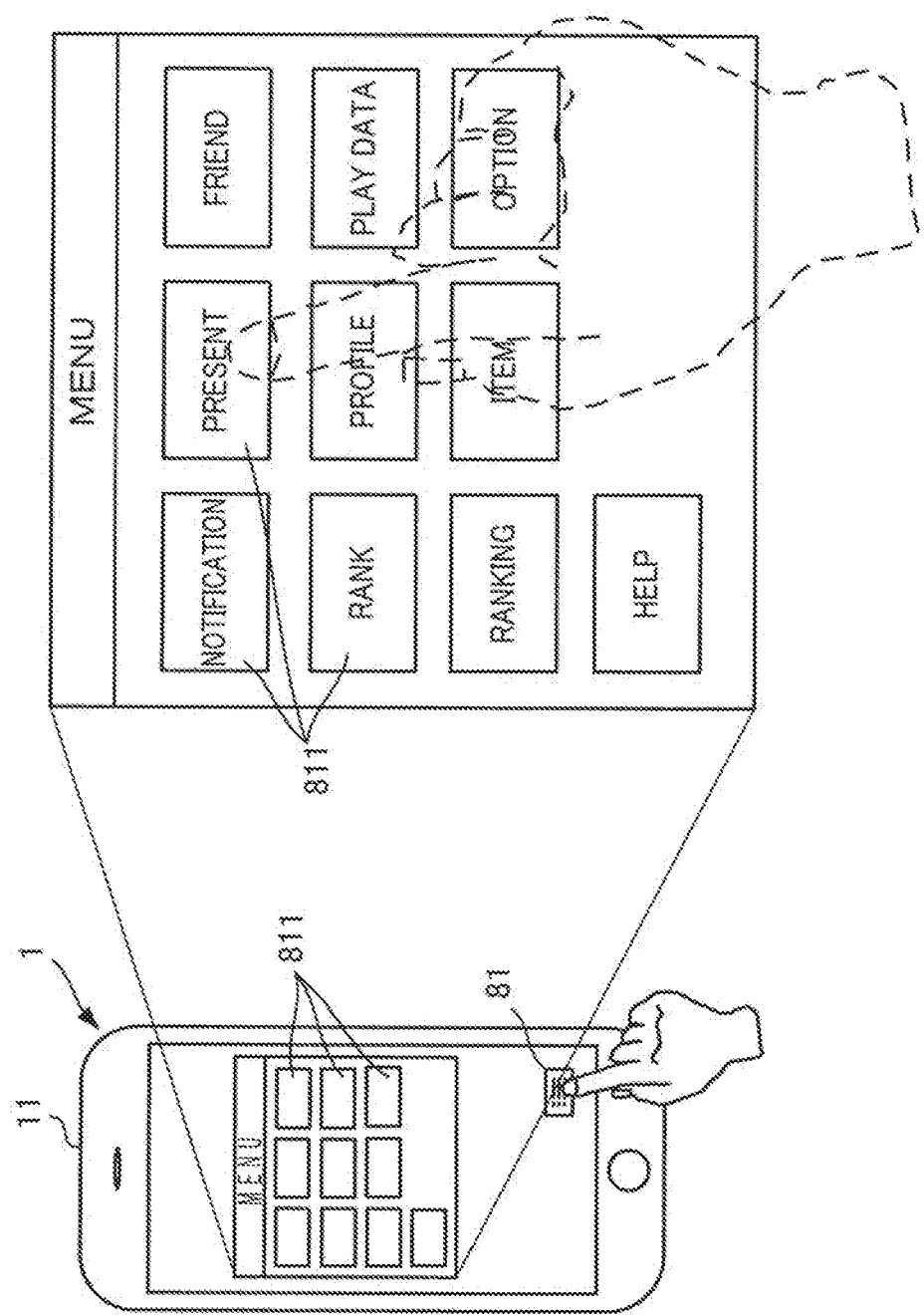
FIG. 3 is an illustrative view showing a display state of the information processor.

As shown in FIG. 3, the information processor 1 having the above-described electrical configuration has various process screens such as a casino screen. On the process screen, a menu button 81 is provided. The menu button 81 is a button for playing a process selection function enabling selection of a main process, and when the player touches it, a menu screen is displayed. The menu screen includes various main process buttons 811 such as "notification", "present", "friend", "rank", "profile", "play data", "ranking", "item", "option", "help", and the like.

For example, when touching the process button 811 of "notification", a screen for notification information from the operator and event information is displayed. When touching the process button 811 of "present", a screen for giving a present is displayed. When touching the process button 811 of "friend", a screen for giving a friend a present or inviting a friend not yet playing a game is displayed. When touching the process button 811 of "item", a screen for using various items during the play of the slot game is displayed.

(Information Processor 1: Present Function)

Figure 4:
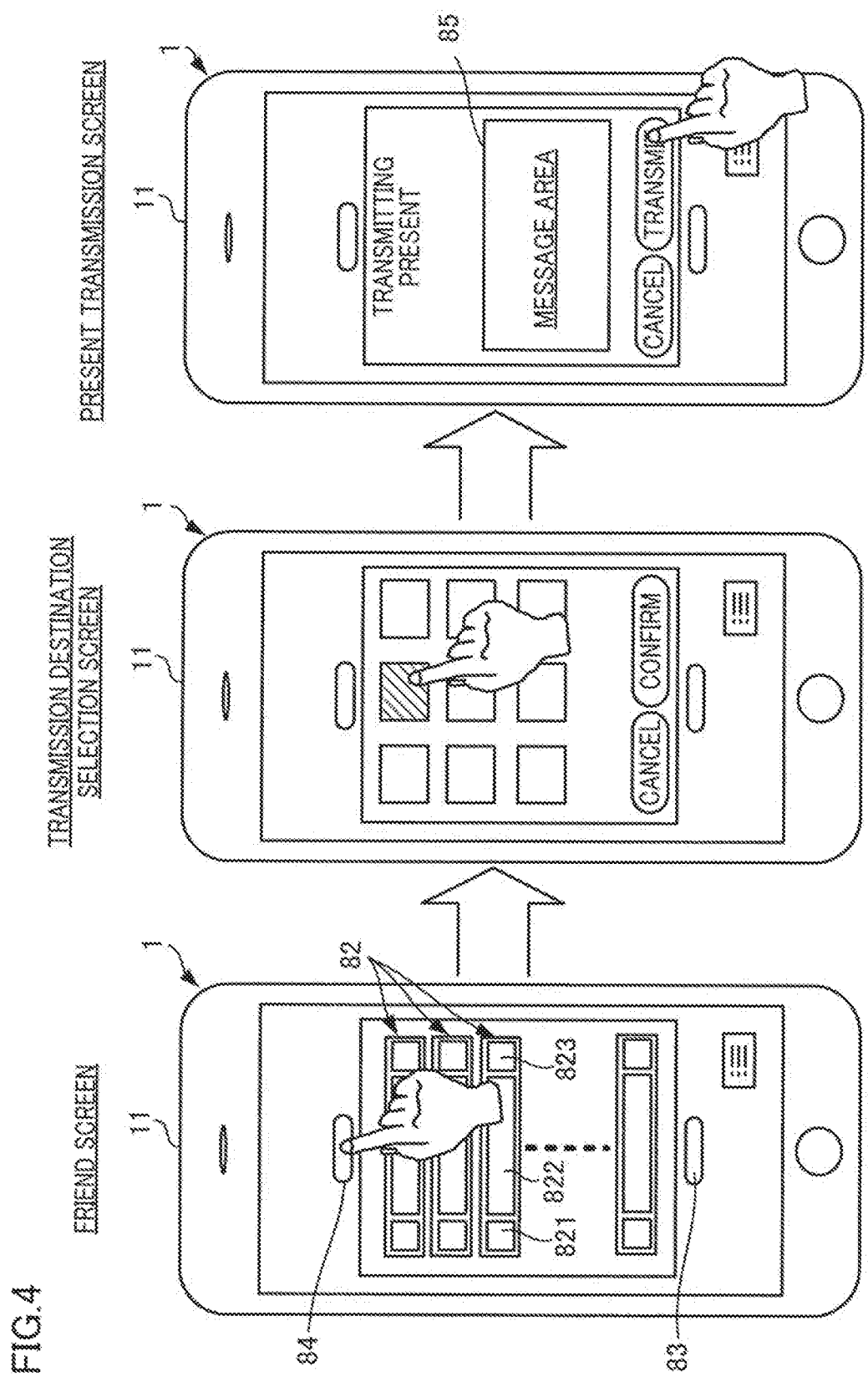
FIG. 4 is an illustrative view showing a display state of the information processor.

As shown in FIG. 4, when the process button 811 of "present" on the menu screen is touched, the present function is played. More specifically, a present screen is displayed. The present screen has a present box 82. The present box 82 reserves presents received from friends or users (players). In addition, the present is stored in the server 7 as a present information of a content corresponding to the status information of the information processor 1 displaying a screen of the present box 82 of the present receiving side. The present information is transmitted from the server 7 and displayed in the present box 82 of the information processor 1 with a predetermined action of touching the "present" button as a trigger.

The present box 82 has an icon display portion 821 for displaying icons of items, a present description portion 822, and a reception button 823. The present description portion 822 is adapted to display the item name, number, message, and receipt time limit. In the message, a single word message of a friend is displayed together with a description of a route from which an item is obtained, such as clearing remuneration of a mission, remuneration of ranking winning, and the like. The reception button 823 is a button for individually receiving the present box 82.

In addition, in the present box 82, a predetermined number such as a maximum of 100 is displayed on one page, and when it exceeds the predetermined number, the present box 82 is switchable to display the next predetermined number of items by the page switching button. In addition, the present box 82 is capable of selecting display conditions such as a full display, a display of only coins, a display of only gems, a display of only items, and the like. Furthermore, the present box 82 can be rearranged in an order from new to old, an order from old to new, and an ascending order of deadline.

The present screen has a batch reception button 83 and a present transmission button 84. The batch reception button 83 makes it possible to collectively receive all the present boxes 82. The present transmission button 84 is a button for transmitting a present. When the present transmission button 84 is touched, a transmission destination selection screen is displayed. In the transmission destination selection screen, when transmitting a present, "batch" and "individual" can be selected. In the case of "batch", a plurality of friends are selected and simultaneously transmitting is performed to these friends. In the case of "individual", it is transmitted to one friend. When the "individual" is selected, a message can be added by switching to a present transmission screen having a message area 85. In addition, the content of the message is limited to a predetermined number of characters such as 15 characters, and registration is prohibited when a prohibited word is included.

(Information Processor 1: Slot Game)

Figure 5:
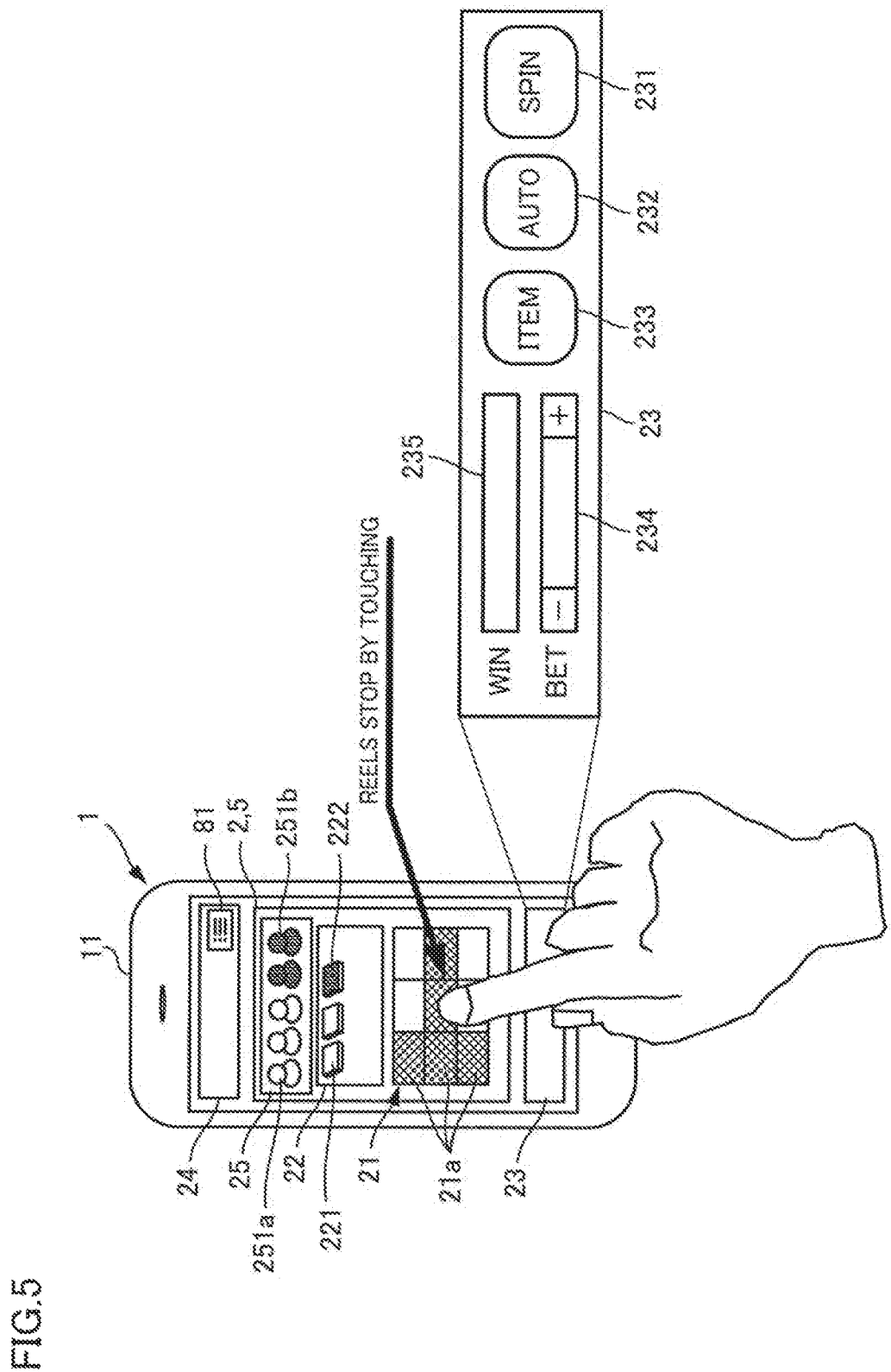
FIG. 5 is an illustrative view showing a display state of the information processor.

As shown in FIG. 5, when the information processor 1 is a game machine that runs a slot game, a slot game screen is displayed on the display 2. The slot game screen includes a game area 21 in which a plurality of symbol display areas 21*a* are displayed in a configuration of a plurality of rows and a plurality of columns, an effect area 22 displaying a dynamic image or a still image such as a game character with matching to the slot game, an operation area 23 operated by the player for the progress of the game, and a game information display area 24 for displaying game contents and game information. The operation area 23 includes a spin button 231, an AUTO button 232, an ITEM button 233, a BET button 234, and a WIN display portion 235 as images.

The touch panel 5 that transmits the game screen is provided on the entire surface of the display 2. The touch panel 5 makes it possible to detect the coordinate of the site touched by the player's finger or the like. Thus, for example, by pressing the image of the spin button 231, one slot game (unit game) can be executed. In addition, by pressing the image of the AUTO button 232, the slot game can be continuously performed.

(Information Processor 1: Slot Game: Definition)

The slot game of the present embodiment has a base game and a bonus game. The "base game" is a game in which a plurality of symbols are stopped and displayed (arranged) after variation in the game area 21, and includes a normal game. In addition, a state in which symbols are stopped and displayed after variation in the game area 21 is referred to "rearrangement". The slot game executes a free game as a bonus game with one or more number of game play. The slot game may have a process of executing a free game in which a bonus payout corresponding to the symbols after rearrangement is given under a condition that the payout rate is larger than that of the normal game.

A "gaming value" given when obtaining a bonus according to the game result is a coin, a bill or an electronic valuable information equivalent thereto. The gaming value in the present invention is not particularly limited, and it may be a gaming medium such as a medal, a token, an electronic money, a ticket, and the like. The ticket is not particularly limited, and may be, for example, a bar-coded ticket or the like. Further, the "gaming value" may also be a game point which does not have an valuable information.

The "free game" is a game that is capable of executing at least bets of gaming value than the normal game. The "capable of executing at least bets of gaming value" includes the case where the bet is "0". Therefore, the "free game" may be a game which is executed without setting the bet of gaming value as a condition and pays the amount of gaming value corresponding to the rearranged symbols. In other words, the "free game" may be a game which is started without a precondition of consumption of gaming value. Correspondingly, the "normal game" may be a game which is executed with setting the bet of gaming value as a condition and pays the amount of gaming value corresponding to the rearranged symbols. In other words, the "normal game" may be a game which is started with a precondition of consumption of gaming value.

The "unit game" is a series of actions from the start of receiving a bet to a state where a bonus can be established. That is, the unit game is a state in which a bet time for receiving a bet, a game time for rearranging the stopped symbols, and a payout time of the payout process for giving the payout are each included for once.

The "rearrangement" is a state in which symbols are stopped and displayed after variation in the game area 21. In other word, the "rearrangement" means a state in which the symbols are rearranged after the arrangement of the symbols are dismissed. The "arrangement" means a state in which the symbols can be confirmed by a visual contact with respect to the player outside.

(Information Processor 1: Slot Game: Friend Function)

The slot game screen on which the slot game is executed has a friend display area 25. The friend display area 25 displays a friend icon image 251*a* and a non-friend icon image 251*b*. The "friend" means a player who is in a relationship in which a friend application and a friend approval are performed with a player who operates another information processor 1. The "non-friend" means a player who is in a relationship in which a friend application and a friend approval are not performed.

The friend icon image 251*a* and the non-friend icon image 251*b* are capable of recognizing whether it is a relationship of friend by color distinguishing. The "friend" is used for the friend function. The friend function is a function that can obtain various benefits by having a relationship with a friend. For example, it is a function that an invitation bonus can be obtained by inviting a friend, a present is given to a friend once a day, a bonus is obtained by playing with a friend, or the like.

(Information Processor 1: Slot Game: Game Content)

Figure 6:
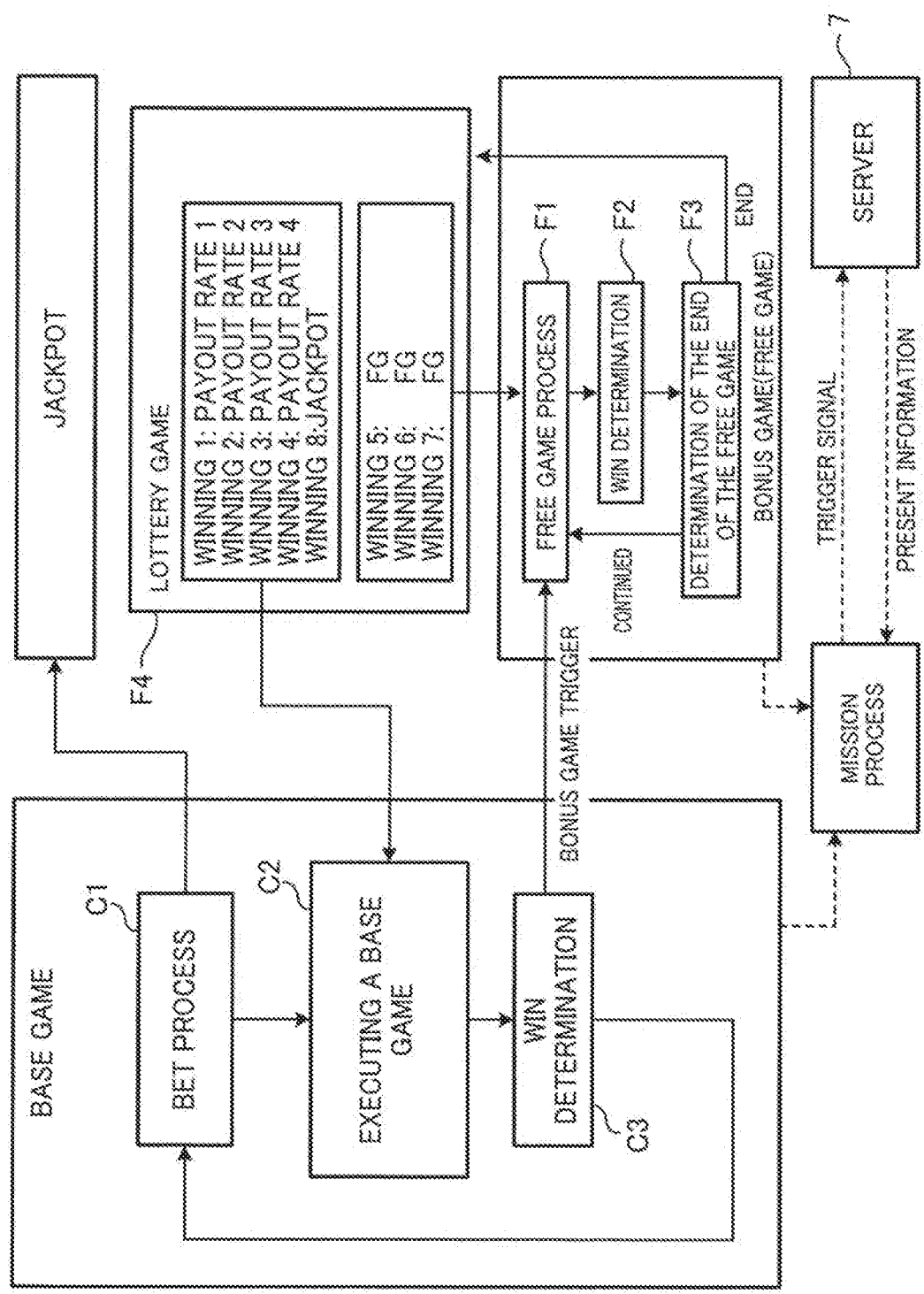
FIG. 6 is an illustrative view showing a game content.

FIG. 6 is a diagram showing a state transition in the information processor 1 which is a game apparatus. Specifically, it shows transition among the base game mode, the bonus game mode (free game), and the lottery game mode. The base game mode is a game state during the normal game, and the bonus game mode corresponds to the game state during the free game.

The information processor 1 has three game modes: a base game mode, a bonus game mode, and a lottery game mode. In the information processor 1, the unit game is executed with the base game mode as a main mode, and when the bonus trigger condition is satisfied in the base game mode, the information processor 1 shifts to the bonus game mode. For example, the trigger of the bonus game is a condition that three or more bonus symbols are repeated (rearranged) from the first reel continuously. In addition, the trigger of the bonus game may be other conditions.

(Information Processor 1: Slot Game: Game Content: Base Game Mode)

Explaining concretely the base game mode, in the game area 21 displayed on the display 2 of FIG. 3, symbols for the slot game of a video reel can be rearranged in three rows and three columns. In a bet process (C1), the bet amount is selected by the player. For example, selection of 1, 2, 3, 5, 10, etc. for the bet amount is enabled by the operation of the bet button 234. Then, the resource obtained through accumulating a part of these bet amount is taken as a jackpot.

Next, when symbols are rearranged by variable display (scroll movement) and stop display (scroll stop) of the video reels, presence or absence of winning is determined (C2). Then, the win determination is performed based on the rearrangement pattern of the rearranged symbols (C3). For example, if bonus symbols are continuous from the first array area (first reel) to the third array area (third reel), the winning of a bonus game trigger is established. In addition, if the bonus symbols and the wild symbol determined as a substitute for the bonus symbols are continuous, the winning of the bonus game trigger is established.

Furthermore, in the win determination of the base game, in the case of obtaining the winning as a trigger of the mission process, the mission process is executed. The mission process is a process in which a mini game related to the slot game or an irrelevant mini game is taken as a mission for the player to complete, a trigger signal is transmitted to the server 7 when the player clears the mission, and the present information is received from the server 7.

(Information Processor 1: Slot Game: Game Content: Bonus Game Mode)

In the base game mode, when the trigger condition of the bonus game is satisfied, the mode is shifted to the bonus game mode, and first the free game process is executed (F1).

In the free game process, a reel strip for the free game to be used during the free game is determined, and a predetermined number of times of execution of the free game is set. In addition, the reel strip and the number of times of execution of the free game for the free game may be set from a random determination among a plurality of selections.

When the free game is executed, a win determination is performed (F2). In addition, the win determination may be the same as the win determination of the base game (C3). For example, when three or more bonus symbols appear consecutively from the first reel, the re-trigger condition of the bonus game (free game) is satisfied.

Thereafter, the end of the free game is determined (F3), and only if the free game has not ended (continued), the remaining free game is executed in F1. On the other hand, when the free game ends, the game shifts to a lottery game (F4).

Furthermore, in the win determination of the bonus game, in the case of obtaining the winning as a trigger of the mission process, the mission process is executed.

(Information Processor 1: Slot Game: Game Content: Lottery Game Mode)

The lottery game is performed by displaying a lottery game screen on the display 2. The lottery game screen has an effect comment screen such as "chance to obtain a large amount of coins" and a first winning part to an eighth winning part which are eight winning display areas. In the case of winning in the first winning part to the fourth winning part, the base game will be shifted to.

Each winning part is corresponding to an award including a bonus game. Specifically, the first winning part is corresponding to an award that enables a payout of a payout rate that is one times the total payout of the bonus game (multiple free games) performed before the lottery game. The second winning part is corresponding to an award that enables a payout of a payout ratio doubling the above-mentioned total payout. The third winning part is corresponding to an award that enables a payout of a payout ratio three times the above-mentioned total payout. The fourth winning part is corresponding to an award that enables a payout of a payout ratio four times the above-mentioned total payout. The fifth winning part is corresponding to an award for the bonus game consisting of free game of five games. The sixth winning part is corresponding to an award for the bonus game consisting of free game of ten games. The seventh winning part is corresponding to an award for the bonus game consisting of free game of fifteen games. The eighth winning part is corresponding to an award of jackpot. Here, the jackpot is a payout which is larger than the payout obtained by the stop symbol array in the base game in general, and one in which a part of the payout is accumulated for each bet is an award (progressive jackpot). In addition, also in the lottery game, the mission process described above may be executed.

(Relationship Between Information Processor 1 and Server 7)

Next, a case will be described where a present is given to the information processor 1 as a transmission destination while playing a slot game from the information processor 1 as a transmission source.

Figure 7:
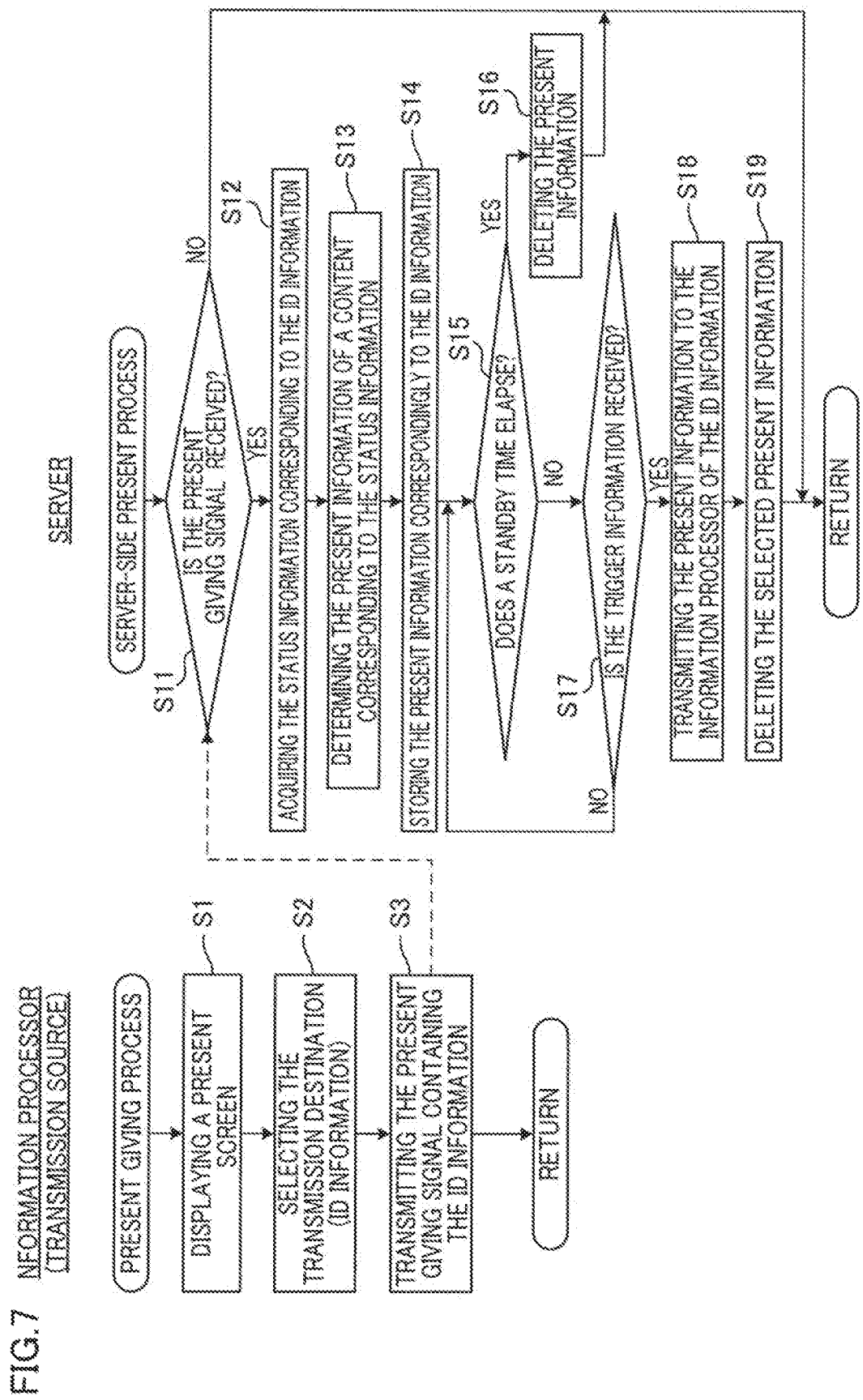
FIG. 7 is a flowchart of a giving present process and a server-side present process.

As shown in FIG. 7, in the information processor 1 of the transmission source, the process button 811 of present in FIG. 3 is touched, whereby the present given process is executed. First, the present screen is displayed (S1). Then, after the transmission destination (ID information) is selected (S2), the present giving signal including the ID information is transmitted to the server 7 (S3).

In the server 7, the server-side present process is executed. When the server-side present process is executed, firstly, it is determined whether or not the present giving signal has been received (S11). If the present giving signal is not received (S11: NO), the present process is terminated. On the other hand, when receiving the present giving signal (S11: YES), the status information of the information processor 1 as the transmission destination corresponding to the ID information is acquired (S12). The present information of a content corresponding to the status information is determined (S13). Thereafter, the present information is stored correspondingly to the ID information (S14).

Next, it is determined whether or not a standby time has elapsed since receiving the present giving signal (S15). When the standby time has elapsed (S15: YES), after the present information is deleted (S16), the present process is terminated. On the other hand, if the standby time has not elapsed (S15: NO), it is determined whether or not the trigger signal transmitted by clearing the mission process occurred during the slot game has been received in the information processor 1 of the transmission destination (S17). If the trigger signal is not received (S17: NO), it is re-executed from S15. On the other hand, when receiving the trigger signal (S17: YES), the present information is transmitted to the information processor 1 of the transmission destination identified by the ID information (S18). Then, after the present information selected in the information processor 1 of the transmission destination is deleted (S19), the present process is terminated.

Figure 8:
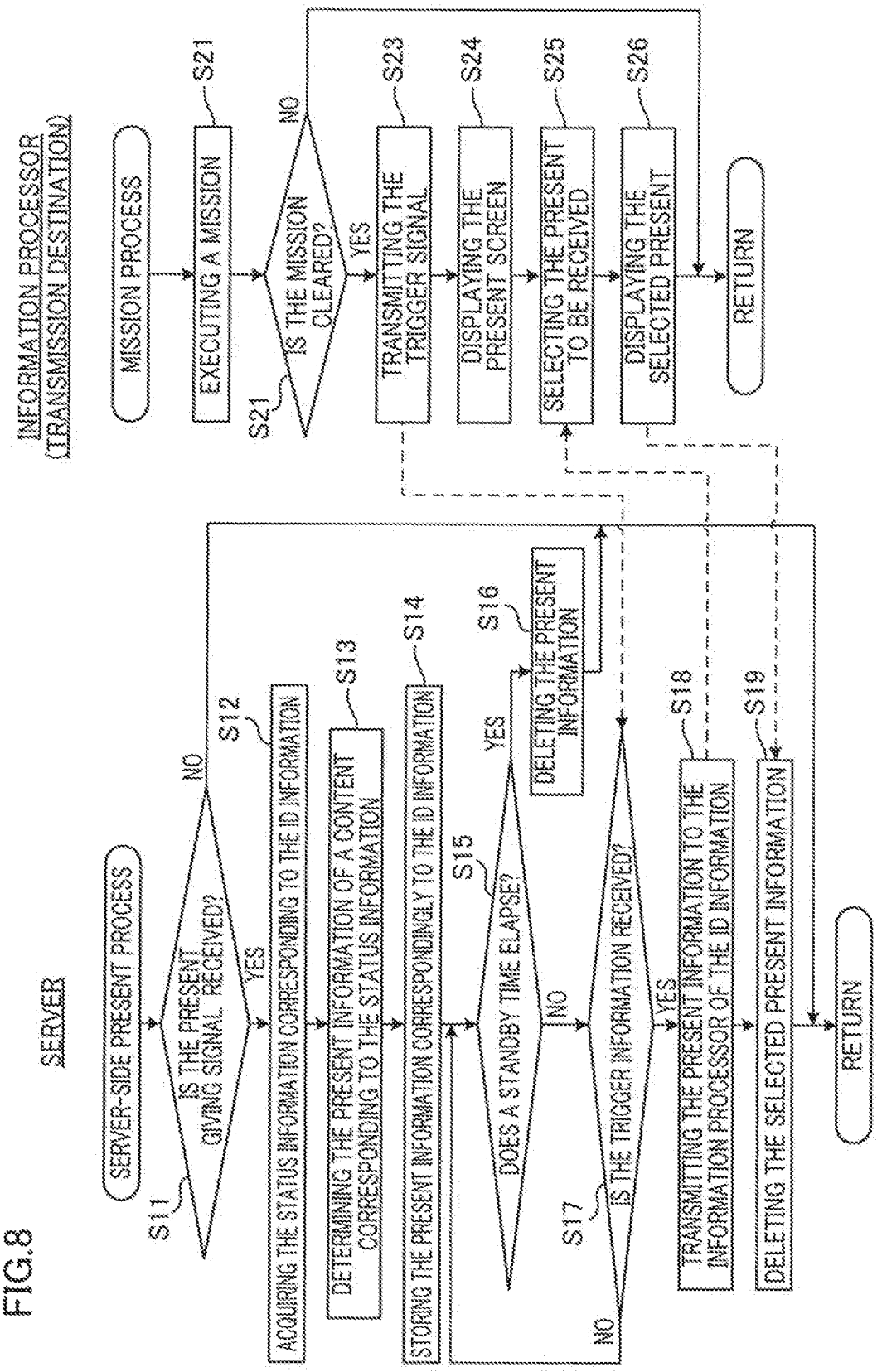
FIG. 8 is a flowchart of a server-side present process and a mission process.

As shown in FIG. 8, when the mission process is executed during the slot game in the information processor 1 of the transmission destination, a mission such as a mini game is executed (S21). If the mission is not cleared (S22: NO), the present process is terminated. On the other hand, when the mission is cleared (S22: YES), a trigger value is transmitted to the server 7 (S23). Thereafter, when receiving the present information from the server 7, the present screen of FIG. 4 is displayed (S24). On the present screen, as the present box 82 is touched, a present to be received is selected (S25). At the same time, in the server 7, the selected present information is deleted. Then, in the information processor 1, after the selected present information is displayed (S26), the present process is terminated.

(Modification)

In the above description, the configuration has been described in which the ID information and the status information are stored in the memory 73 of the server 7 and a present of a content corresponding to the status information of the transmission destination is determined, but the present invention is not limited thereto, and it may also be configured that the ID information and the status information are stored in the memory 3 of the information processor 1 so as to give a present directly among the information processors 1. In this case, it is possible to reduce the load on the server 7, and it is possible to increase the motivation for playing games with each other by logging-in to the server 7 due to the exchange of presents among the information processors 1.

Figure 9:
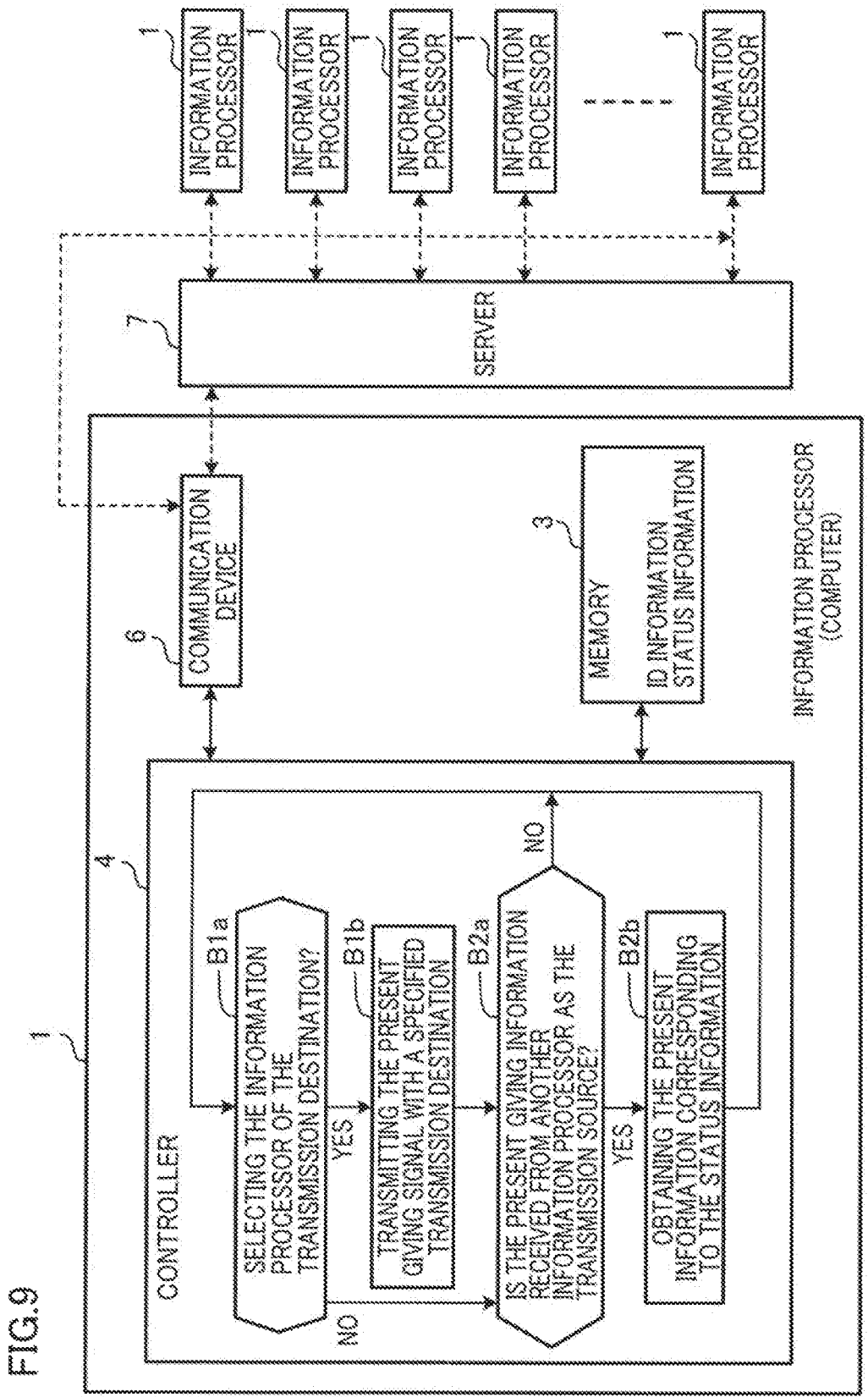
FIG. 9 is an illustrative view showing a schematic configuration of a server.

As shown in FIG. 9, more specifically, the information processor 1 connected with the server 7 which causes a logged-in information processor 1 to run a game among the plurality of information processors 1 comprises a communication device 6 (communication unit) enabling a data communication with the server 7, a memory 3 storing an ID information for identifying each of the plurality of information processors 1 and a status information indicating a status that increases correspondingly to the degree of progress of a game, and a controller 4 programmed to execute the following processes.

In the process (B1), the present giving signal for giving a present is transmitted to another information processor 1 as a transmission destination by identifying the ID information. In the process (B2), the present of a content corresponding to the status information is obtained when receiving the present giving signal from another information processor 1 as a transmission source.

According to the configuration mentioned above, the information processor 1 implements a game control method in which the computer executes the above processes (B1) and (B2). In addition, the information processor 1 has a game program for executing the above processes (B1) and (B2).

Further, in the process (B1), the information processor 1 may transmit the present giving signal on condition that a mission in the game is cleared. In this case, it is possible to raise the motivation of the player to participate in the game by taking clearing the mission in the game as a condition for transmitting the present giving signal.

Although the embodiment of the present invention has been described above, it is merely a specific example, and the present invention is not particularly limited, and the specific configuration of each means and the like can be appropriately designed and changed. In addition, the effects described in the embodiments of the present invention are merely a list of the most preferable effects produced by the present invention, and the effects of the present invention are not limited to those described in the embodiments of the present invention.

What is claimed is:

1. A server configured to communicate with one or more of a plurality of information processors via a communications network, the server allowing the plurality of information processors to execute a game, the server comprising:
   a controller including a central processing unit (CPU); and,
   a non-transitory computer readable memory storing:
      ID information identifying each of the plurality of information processors,
      game status information indicating a degree of progress in the game of each of the plurality of information processors, and
      award information including award content available to one or more of the plurality of information processors,
   wherein the CPU is programmed to:
      (A1) upon receiving an award providing signal for providing an award to an information processor of a transmission destination identified by the ID information, determining the award information to be provided to the transmission destination based on the game status information and the ID information of the transmission destination;
      (A2) storing the award information determined in the process (A1) in the memory; and
      (A3) upon the performance of a predetermined action by the information processor of the transmission destination identified by the ID information, transmitting the award information stored in the process (A2) to the information processor of the transmission destination identified by the ID information.

2. The server of claim 1, wherein, in the process (A2), the award information stored in the memory is deleted after a lapse of a predetermined standby time.

3. The server of claim 2, wherein, the predetermined action in the process (A3) is logging-in to the server.

4. An information processor communicatively connected with a server via a communications network, the information processor configured to cause a logged-in information processor to execute a game among one or more of a plurality of logged-in information processors, comprising:
   a controller including a central processing unit (CPU);
   a non-transitory computer readable memory storing ID information identifying each of the plurality of information processors and game status information indicating a game status based on a degree of progress in the game of each of the plurality of information processors;
   wherein, the CPU is programmed to:
      (B1) transmit an award providing signal to one or more of the plurality of the information processors serving as a transmission destination based on the ID information; and
      (B2) upon receiving the award providing signal from one or more of the plurality of information processors serving as a transmission source, obtaining award information based on the game status information of the one or more of the plurality of information processors serving as the transmission source.

5. The information processor of claim 4, wherein, in the process (B1), the award providing signal is transmitted on condition that a mission in the game is cleared.

6. A non-transitory computer readable storage medium storing a computer executable game program, which when executed by a central processing unit (CPU) of an information processor communicatively connected to a server causes the CPU to:
   execute a game at one or more of a plurality of logged-in information processors;
   store, to a non-transitory computer readable memory, ID information identifying each of the plurality of logged-in information processors along with game status information indicating a game status of each of the logged-in information processors based on a degree of progress in the game;
   transmit an award providing signal to one or more of the plurality of logged-in information processors serving as a transmission destination based on the ID information; and
   upon receiving the award providing signal from one or more of the plurality of logged-in information processors serving as a transmission source, obtaining award information based on the game status information of the one or more of the plurality of the logged-in information processors serving as the transmission source.

7. A game control method executable by a computer in data communication with a server to cause a logged-in information processor to execute a game among a plurality of information processors, the method comprising
   storing, to a non-transitory computer readable medium, ID information identifying each of the plurality of information processors and game status information indicating a degree of progress in the game of each of the plurality of information processors;
   transmitting an award providing signal to one or more of the plurality of information processors serving as a transmission destination based on the ID information; and,
   upon receiving the award providing signal from one or more of the plurality of information processors serving as a transmission source, obtaining award information based on the game status information of the one or more of the plurality of information processors serving as the transmission source.

* * * * *